(12) United States Patent  
Yoshino et al.

(10) Patent No.: US 9,010,453 B2  
(45) Date of Patent: Apr. 21, 2015

(54) METHOD FOR MONITORING ROTARY SHAFT ROTATION SPEED FLUCTUATION IN MACHINE TOOL, MONITOR APPARATUS, AND MACHINE TOOL

(75) Inventors: Kiyoshi Yoshino, Niwa-Gun (JP); Hajimu Ishii, Niwa-Gun (JP); Kohei Nishimura, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 810 days.

(21) Appl. No.: 13/275,623

(22) Filed: Oct. 18, 2011

(65) Prior Publication Data

US 2012/0097411 A1    Apr. 26, 2012

(30) Foreign Application Priority Data

Oct. 20, 2010 (JP) ................. 2010-235720  
Oct. 22, 2010 (JP) ................. 2010-237704  
Dec. 21, 2010 (JP) ................. 2010-284815

(51) Int. Cl.
    *B23Q 5/00*     (2006.01)
    *G06F 15/00*    (2006.01)
    *B23Q 17/12*    (2006.01)
    *B23Q 17/10*    (2006.01)

(52) U.S. Cl.
    CPC ............... *B23Q 17/12* (2013.01); *B23Q 17/10* (2013.01)

(58) Field of Classification Search
    CPC .................................. B23Q 5/00; G06F 15/00
    USPC ..................................... 173/1, 176
    See application file for complete search history.

(56) References Cited

U.S. PATENT DOCUMENTS

2012/0109360 A1    5/2012  Nishimura et al.

FOREIGN PATENT DOCUMENTS

| JP | 49-105277 A1 | 10/1974 |
| JP | 58-165951 A  | 10/1983 |
| JP | 61-003522 Y2 | 2/1986  |
| JP | 11-129144 A  | 5/1999  |
| JP | 2012-091283 A1 | 5/2012 |

OTHER PUBLICATIONS

Japanese Office Action (Application No. 2010-284814) dated May 20, 2014.  
Japanese Office Action (Application No. 2010-237704) dated Feb. 21, 2014.

*Primary Examiner* — Michelle Lopez  
(74) *Attorney, Agent, or Firm* — Burr & Brown, PLLC

(57) ABSTRACT

In suppressing chatter vibration of a rotary shaft in a machine tool by fluctuating rotation speed of the rotary shaft, easy setting of a fluctuation parameter is realized. In a monitor apparatus of the machine tool, a graph showing a fluctuation amplitude of the rotation speed is displayed. On this graph, a current fluctuation position (first point) is indicated by a black circle marker, and also, a power limit line L of a motor fluctuation period is depicted based on a predetermined equation. In an area not exceeding the power limit line L, a new fluctuation position (second point) having a larger fluctuation amplitude and a shorter fluctuation period than the current fluctuation position is calculated and indicated with an arrow A guiding this new point from the current fluctuation position.

9 Claims, 12 Drawing Sheets

METHOD FOR MONITORING ROTARY SHAFT ROTATION SPEED FLUCTUATION IN MACHINE TOOL, MONITOR APPARATUS, AND MACHINE TOOL

BACKGROUND OF THE INVENTION

This application claims the benefit of Japanese Patent Application Numbers 2010-235720, 2010-237704 and 2010-284815 filed on Oct. 20, 2010, Oct. 22, 2010 and Dec. 21, 2010 respectively, the entirety of which is incorporated by reference.

TECHNICAL FIELD

This invention relates to a method for monitoring rotation speed fluctuation of a rotary shaft of a machine tool having the rotary shaft driven by a motor after mounting a tool or a workpiece thereon, wherein rotation speed of the rotary shaft is continuously fluctuated at an arbitrary pattern. This invention also relates to a monitor apparatus and a machine tool.

BACKGROUND ART

A phenomenon called "chatter vibration" may occur when cutting is conducted by using a machine tool having a rotary shaft driven by a motor after mounting a tool or a workpiece thereon, and rigidity of the tool or the workpiece is insufficient. The chatter vibration is associated with the problems of tool chipping and loss of workpiece surface precision. The chatter vibration is caused by the increase in vibration by the change of the thickness of the workpiece cut by the tool due to the phase delay between surface contour created by the previous rotation and the vibration caused by the ongoing cutting.

Japanese Patent Laid-Open No. 49-105277 and Japanese Utility Model Publication No. 61-3522 propose counter measures that may be taken to suppress the chatter vibration. The technologies described in Japanese Patent Laid-Open No. 49-105277 and Japanese Utility Model Publication No. 61-3522 are those which attempt to reduce the chatter vibration by fluctuating the rotation speed of the rotary shaft at a predetermined fluctuation amplitude and a fluctuation period to thereby irregularize power applied by the change in the thickness of the workpiece cut by the tool.

SUMMARY OF THE INVENTION

However, the methods described in Japanese Patent Laid-Open No. 49-105277 and Japanese Utility Model Publication No. 61-3522 had the problem that setting of two parameters, namely, the fluctuation amplitude and the fluctuation period (hereinafter referred to as the "fluctuation values" when differentiation between these parameters are not required) had been necessary to fluctuate the rotation speed, and it had been difficult for an unskilled operator to choose the parameters to be fluctuated.

In addition, fluctuation of the rotary shaft rotation speed can not be realized when an inappropriate amplitude or period is instructed since, when the amplitude of the rotation speed divided by the rotation speed used is a fluctuation amplitude Q, a rotation speed fluctuation rate, namely, the fluctuation amplitude Q divided by a period R is a function of inertia J of the rotary unit (determined by rotary shaft itself, chuck, and workpiece), rotary shaft torque T, cutting torque Tc required for the cutting the workpiece, and rotation speed S, as shown by the following equation (1).

$$\frac{Q}{R} = \frac{1500}{\pi S J}(T - Tc) \quad (1)$$

An upper limit is present for the electric current applied to the motor used for rotating the rotary shaft since excessive electric current applied to the motor results in the temperature increase and damage of the motor, and this in turn means that there is a limit in the rotary shaft torque. In addition, as evident from the equation (1), it is only the main spindle torque from which the cutting torque Tc has been subtracted that is used in the fluctuation of the rotation speed. Accordingly, even if a large amplitude and a short period is used for the purpose of increasing the fluctuation rate Q/R of the rotation speed, the rotary shaft torque will exceed the limitation, and in such case, the intended fluctuation may not be realized. In addition, since each workpiece has different shape, inertia J is not constant, and the upper limit of the fluctuation rate of the rotation speed is not constant. Accordingly, it is not easy to show a range of the amplitude and period that can be set.

As described above, the conventional technology wherein the rotation speed is fluctuated by setting the amplitude and the period as the parameters had the drawback that the operator would face difficulty in realizing the rotation speed fluctuation that would be effective in suppressing the chatter vibration.

The present invention has been completed in view of the situation as described above, and an object of the present invention is to provide a method, a monitor apparatus, and a machine tool, which are used for monitoring rotation speed fluctuation of a rotary shaft of a machine tool wherein the rotation speed of the rotary shaft is continuously fluctuated at an arbitrary pattern, and fluctuation values for fluctuating the rotation speed can be readily selected to thereby find the optimal processing condition for suppressing the chatter vibration.

In order to realize the objects as described above, a first aspect of the present invention is a method for monitoring rotation speed fluctuation of a rotary shaft of a machine tool having the rotary shaft driven by a motor after mounting a tool or a workpiece thereon, and a rotation speed-fluctuating unit for continuously fluctuating rotation speed of the rotary shaft at an arbitrary pattern. The monitoring is accomplished by a display section, and the method comprises a diagram-preparing step in which a fluctuation diagram showing an amplitude of the rotation speed fluctuation in relation to a period of the rotation speed fluctuation is prepared for display on the display section, a first displaying step in which a current fluctuation position is displayed on the fluctuation diagram, and a power limit line-displaying step in which a power limit line for the fluctuation period of the motor is prepared based on the following equation (2):

$$Q = \frac{45000}{\pi^2 S^2 J}(P - Pc)R \quad (2)$$

[Q: amplitude of the rotation speed fluctuation [%], R: period of the rotation speed fluctuation [s], S: rotation speed of the rotary shaft [min$^{-1}$], J: inertia of the rotary shaft [kg·m$^2$], P: maximum power applied to the motor [W], Pc: sum of cutting power and power loss [W]], and the thus prepared power limit line is displayed on the fluctuation diagram.

A second aspect of the present invention is the method for monitoring rotation speed fluctuation of a rotary shaft of a machine tool of the first aspect wherein the method further comprises a fluctuation position-calculating step in which a new fluctuation position not exceeding the power limit line but with a larger fluctuation amplitude and/or a shorter fluctuation period compared with the current fluctuation position is calculated, and a second displaying step in which the new fluctuation position is displayed on the fluctuation diagram with a guide of the change from the current fluctuation position.

In order to realize the objects as described above, a third aspect of the present invention is the method for monitoring rotation speed fluctuation of a rotary shaft of a machine tool having the rotary shaft driven by a motor after mounting a tool or a workpiece thereon, and a rotation speed-fluctuating unit for continuously fluctuating rotation speed of the rotary shaft at an arbitrary pattern. The monitoring is accomplished by a display section, and the method comprises a diagram-preparing step in which a fluctuation diagram showing an amplitude of the rotation speed fluctuation in relation to an angular acceleration is prepared for display on the display section comprises a first displaying step in which a current fluctuation position is displayed on the fluctuation diagram, and a power limit line-displaying step in which a power limit line for the fluctuation period of the motor is prepared based on the following equation (4):

$$\dot{\omega} = \frac{30}{\pi SJ}(P - Pc) \qquad (4)$$

[ω: angular acceleration [rad/s²], S: rotation speed of the rotary shaft [min⁻¹], J: inertia of the rotary shaft [kg·m²], P: maximum power applied to the motor [W], Pc: sum of cutting power and power loss [W]], and the thus prepared power limit line is displayed on the fluctuation diagram.

A fourth aspect of the present invention is the method for monitoring rotation speed fluctuation of a rotary shaft of a machine tool of the third aspect wherein the method further comprises a fluctuation position-calculating step in which a new fluctuation position not exceeding the power limit line but with a larger fluctuation amplitude and/or a larger angular acceleration compared with the current fluctuation position is calculated, and a second displaying step in which the new fluctuation position is displayed on the fluctuation diagram with a guide of the change from the current fluctuation position.

A fifth aspect of the present invention is the method for monitoring rotation speed of a rotary shaft of the machine tool of the second or fourth aspect wherein the new fluctuation position is a position on the power limit line where the fluctuation amplitude is the same as that of the current fluctuation position.

A sixth aspect of the present invention is the method for monitoring rotation speed of a rotary shaft of the machine tool of the second or fourth aspect wherein the new fluctuation position is a position on the power limit line where the fluctuation amplitude is at its maximum.

In order to realize the objects as described above, a seventh aspect of the present invention is a monitor apparatus for monitoring rotation speed fluctuation of a rotary shaft in a machine tool having the rotary shaft driven by a motor after mounting a tool or a workpiece thereon, and a rotation speed-fluctuating unit for continuously fluctuating rotation speed of the rotary shaft at an arbitrary pattern. The monitor apparatus also has a display section for monitoring fluctuation of the rotation speed by the rotation speed-fluctuating unit. This monitor apparatus comprises a diagram-preparing unit which prepares a fluctuation diagram showing an amplitude of the rotation speed fluctuation in relation to a period of the rotation speed fluctuation, and displays the thus prepared diagram on the display section, a first displaying unit which displays a current fluctuation position on the fluctuation diagram, and a power limit line-displaying unit which prepares a power limit line for the fluctuation period of the motor based on the following equation (2):

$$Q = \frac{45000}{\pi^2 S^2 J}(P - Pc)R \qquad (2)$$

[Q: amplitude of the rotation speed fluctuation [%], R: period of the rotation speed fluctuation [s], S: rotation speed of the rotary shaft [min⁻¹], J: inertia of the rotary shaft [kg·m²], P: maximum power applied to the motor [W], Pc: sum of cutting power and power loss [W]], and the thus prepared power limit line is displayed on the fluctuation diagram.

A eighth aspect of the present invention is the monitor apparatus for monitoring rotation speed of a rotary shaft in a machine tool of the seventh aspect wherein the monitor apparatus further comprises a fluctuation position-calculating unit which calculates a new fluctuation position not exceeding the power limit line but with a larger fluctuation amplitude and/or a shorter fluctuation period compared with the current fluctuation position, and a second displaying unit which displays the new fluctuation position on the fluctuation diagram with a guide of the change from the current fluctuation position.

In order to realize the objects as described above, a ninth aspect of the present invention is a monitor apparatus for monitoring rotation speed fluctuation of a rotary shaft in a machine tool having the rotary shaft driven by a motor after mounting a tool or a workpiece thereon, and a rotation speed-fluctuating unit for continuously fluctuating rotation speed of the rotary shaft at an arbitrary pattern. The monitor apparatus also has a display section for monitoring fluctuation of the rotation speed by the rotation speed-fluctuating unit. This monitor apparatus comprises a diagram-preparing unit which prepares a fluctuation diagram showing an amplitude of the rotation speed fluctuation in relation to an angular acceleration, and displays the thus prepared diagram on the display section, a first displaying unit which displays a current fluctuation position on the fluctuation diagram, and a power limit line-displaying unit which prepares a power limit line for the fluctuation period of the motor based on the following equation (4):

$$\dot{\omega} = \frac{30}{\pi SJ}(P - Pc) \qquad (4)$$

[ω: angular acceleration [rad/s²], S: rotation speed of the rotary shaft [min⁻¹], J: inertia of the rotary shaft [kg·m²], P: maximum power applied to the motor [W], Pc: sum of cutting power and power loss [W]], and the thus prepared power limit line is displayed on the fluctuation diagram.

A tenth aspect of the present invention is the monitor apparatus for monitoring rotation speed of a rotary shaft of the ninth aspect wherein the monitor apparatus further comprises a fluctuation position-calculating unit which calculates a new fluctuation position not exceeding the power limit line but with a larger fluctuation amplitude and/or a larger angular acceleration compared with the current fluctuation position, and a second displaying unit which displays the new fluctuation position on the fluctuation diagram with a guide of the change from the current fluctuation position.

An eleventh aspect of the present invention is the monitor apparatus of the eighth or tenth claim wherein the new fluctuation position is a position on the power limit line where the fluctuation amplitude is the same as that of the current fluctuation position.

A twelfth aspect of the present invention is the monitor apparatus of the eighth or tenth claim wherein the new fluctuation position is a position on the power limit line where the fluctuation amplitude is at its maximum.

In order to realize the objects as described above, a thirteenth aspect of the present invention is a machine tool having a rotary shaft driven by a motor after mounting a tool or a workpiece thereon, and a rotation speed-fluctuating unit for continuously fluctuating rotation speed of the rotary shaft at an arbitrary pattern, wherein the machine tool has a monitor apparatus for monitoring the rotation speed fluctuation of the rotary shaft.

In order to realize the objects as described above, a fourteenth aspect of the present invention is a machine tool having a rotary shaft driven by a motor after mounting a tool or a workpiece thereon, a fluctuation value-setting unit which sets a fluctuation amplitude and a fluctuation period of rotation speed of the rotary shaft, and a rotation speed-fluctuation unit which controls the rotation speed of the rotary shaft based on the fluctuation amplitude and the fluctuation period set by the fluctuation value-setting unit, wherein the fluctuation value-setting unit sets a ratio of the fluctuation amplitude to the fluctuation period, and simultaneously sets the fluctuation amplitude and the fluctuation period based on the ratio.

A fifteenth aspect of the present invention is the machine tool of the fourteenth aspect wherein the fluctuation value-setting unit sets the ratio of the fluctuation amplitude to the fluctuation period based on rated power of the motor, cutting power, percentage of the cutting power in the rated power of the motor, average of the rotation speed, and inertia of the rotary shaft.

A sixteenth aspect of the present invention is the machine tool of the fifteenth aspect wherein the fluctuation value-setting unit sets the ratio of the fluctuation amplitude to the fluctuation period based on the following equation (5):

$$\frac{Q}{R} = \frac{45000}{\pi^2 S^2 J}(0.01ePn - Pc) \quad (5)$$

[Q: amplitude of the rotation speed fluctuation [%], R: period of the rotation speed fluctuation [s], S: average rotation speed [min$^{-1}$], J: inertia of the rotary shaft [kg·m$^2$], Pn: rated power of the motor [W], Pc: cutting power [W], e: percentage used [%]].

A seventeenth aspect of the present invention is a machine tool of any one of the fourteenth to sixteenth aspects wherein the fluctuation value-setting unit has a display unit which displays a graph showing the fluctuation amplitude in relation to the fluctuation period, and the graph shows a current position of the fluctuation amplitude and the fluctuation period and a line corresponding to the ratio of the fluctuation amplitude to the fluctuation period.

In order to realize the objects as described above, an eighteenth aspect of the present invention is a machine tool having a motor-driven rotary shaft for rotating a tool or a workpiece, and a rotation speed-fluctuating unit capable of fluctuating rotation speed of the rotary shaft at a predetermined amplitude and period, wherein the machine tool further comprises a parameter value-setting unit wherein the parameters are either one of the amplitude and the period and either one of rotary torque of the rotary shaft and power applied to the motor which rotates the rotary shaft, and the rotation speed-fluctuating unit fluctuates the rotation speed of the rotary shaft based on the parameter values set by the parameter value-setting unit.

A nineteenth aspect of the present invention is the machine tool of the eighteenth aspect wherein the rotation speed-fluctuating unit fluctuates the rotation speed so that an absolute value of the angular acceleration during acceleration of the rotation speed of the rotary shaft is equal to an absolute value of the angular acceleration during deceleration of the rotation speed of the rotary shaft, based on the parameter values set by the parameter value-setting unit.

A twentieth aspect of the present invention is the machine tool of the eighteenth or nineteenth aspect further comprising a display unit for displaying a plane defined by axes corresponding to selected parameters wherein an area within which the parameters can be set and/or current parameter values are indicated.

A twenty-first aspect of the present invention is the machine tool of the eighteenth aspect further comprising at least one of a first selection unit which selects either one of the amplitude and the period for the parameter, and a second selection unit which selects either one of the rotary torque of the rotary shaft and the power applied to the motor which rotates the rotary shaft for the parameter.

A twenty-second aspect of the present invention is the machine tool of the eighteenth aspect further comprising a memory unit which stores the parameter values set by the parameter value-setting unit.

In the inventions of the first, third, seventh, ninth and thirteenth aspects, the operator can readily select the values used for fluctuating the rotation speed of the rotary shaft based on the current fluctuation position and the power limit line even if two values, namely, the fluctuation amplitude and fluctuation period are to be set.

In the inventions of the second, fourth, eighth and tenth aspects, in addition to the merits as described above, the operator can quickly and readily find the processing condition optimal for suppressing the chatter vibration by the calculation and displaying of the new fluctuation position.

In the inventions of the fifth and eleventh aspects, in addition to the merits as described above, effective chatter vibration suppression is realized due to the short fluctuation period, and since the fluctuation amplitude is the same, difference between the maximum and minimum cutting speed is constant, and poor surface precision caused by the difference in the cutting speed is thereby minimized.

In the inventions of the sixth and twelfth aspects, effective chatter vibration suppression is expected.

In the invention of the fourteenth aspect, two parameters, namely, the fluctuation amplitude and the fluctuation period can be simultaneously set by one operation. Accordingly, the operator, whether experienced or not, can readily set the fluctuation value for fluctuating the rotation speed of the rotary shaft.

In the inventions of the fifteenth and sixteenth aspects, in addition to the merits as described above, the fluctuation values can be set under the situation where excessive electric current flow is avoided, and occurrence of the thermal displacement by the heating of the motor is avoided.

In the invention of the seventeenth aspect, in addition to the merits of any one of the fourteenth to sixteenth aspects, a current fluctuation value and a new fluctuation value can be readily recognized by the graph, and setting of the fluctuation values can be more readily conducted.

In the invention of the eighteenth aspect, either one of the amplitude and the period and either one of the rotary shaft torque of the rotary shaft and the power applied to the motor for rotating the rotary shaft are used for the parameter, and a parameter-setting unit is provided for setting the parameter values and the rotation speed-fluctuating unit fluctuates the rotation speed of the rotary shaft based on the parameter values set by the parameter-setting unit. The range of the parameters that can be set is clear since at least the rotary shaft torque and the power applied are limited for their value in contrast with the conventional case where the amplitude and the period have been used for the parameter, and accordingly, the operator can readily realize the rotation speed fluctuation effective for suppressing the chatter vibration without setting an unrealizable fluctuation values.

In the invention of the nineteenth aspect, the rotation speed-fluctuating unit fluctuates the rotation speed so that an absolute value of the angular acceleration during acceleration of the rotation speed of the rotary shaft is consistent with an absolute value of the angular acceleration during deceleration of the rotation speed of the rotary shaft, and therefore, the rotation speed can be fluctuated at a constant period.

In the invention of the twentieth aspect, the display unit is provided, and the area where each parameter can be set and/or the current value may be indicated on a plane defined by axes corresponding to the selected parameters on this display unit. Therefore, the ongoing situation as well as the area where parameter can not be set can be readily grasped to enable more effective suppression of the chatter vibration.

In the invention of the twenty-first aspect, the machine tool has at least one of the first selection unit which selects either one of the amplitude and the period for the parameter, and the second selection unit which selects either one of the rotary torque of the rotary shaft and the power applied to the motor which rotates the rotary shaft for the parameter. Therefore, the tool is convenient to use.

In the invention of the twenty-second aspect, various parameter values that have been used can be stored as a processing database for reference in the subsequent operations since the memory unit for storing the parameter values is provided.

DETAILED DESCRIPTION OF THE EXEMPLARY EMBODIMENTS

Figure 1:
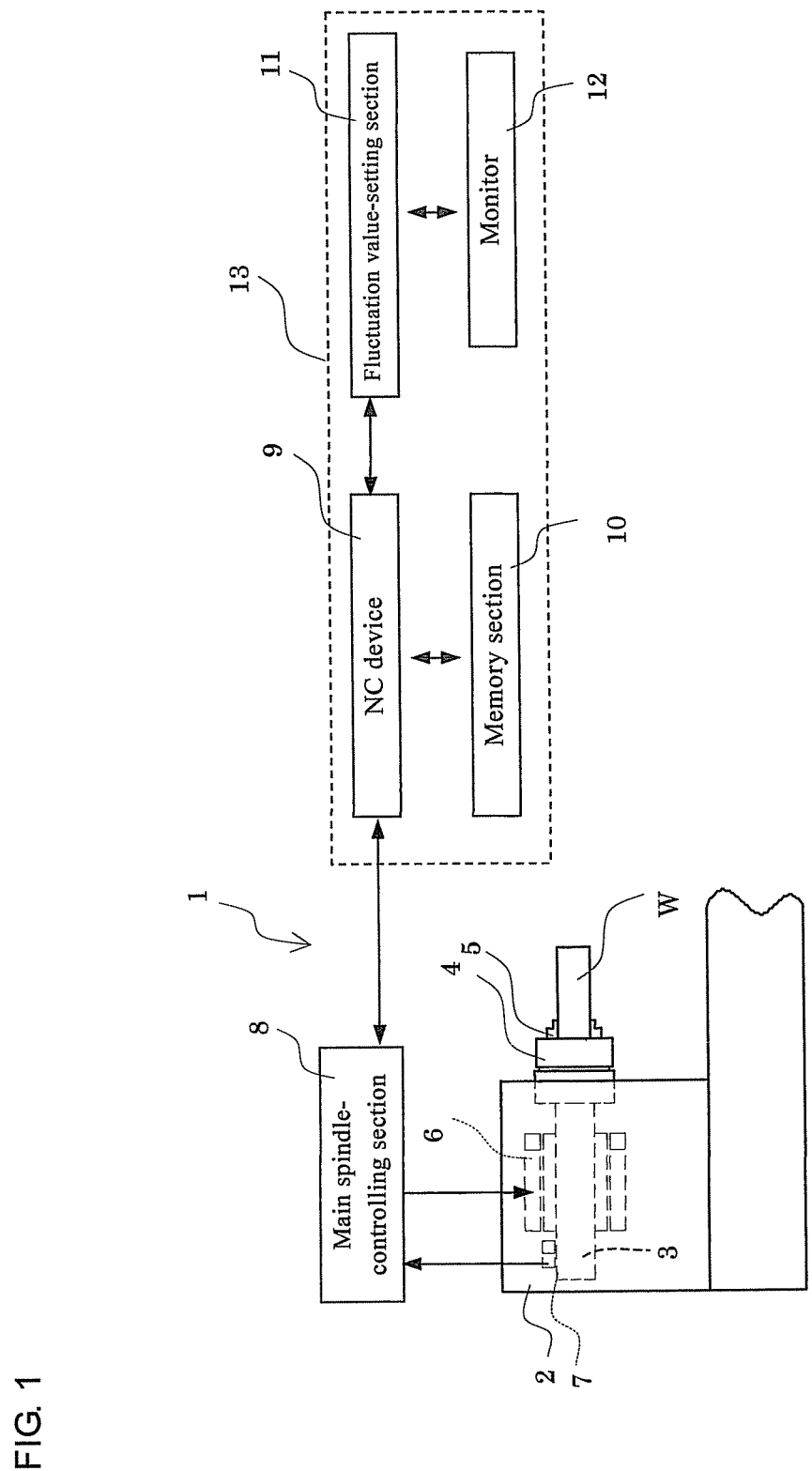
FIG. 1 is a schematic view of the NC lathe of embodiment 1.

Next, embodiments of the present invention are described in detail by referring to the drawings.

Embodiment 1

FIG. 1 is a schematic view of an NC lathe 1 which is an embodiment of the machine tool. In the NC lathe 1, a main spindle 3 (rotary shaft) is rotatably supported on a headstock 2, and the main spindle 3 grips a workpiece W by a chuck 4 and claws 5. The headstock 2 accommodates a motor 6 which is driven to rotate the main spindle 3 and an encoder 7 secured to the headstock 2 and configured to detect the rotation speed of the main spindle 3.

The motor 6 and the encoder 7 are connected to a main spindle control section 8, and an NC device 9 gives instructions on the rotation speed to the main spindle control section 8. The main spindle control section 8 continuously monitors the rotation speed of the main spindle 3 detected by the encoder 7, and adjusts the power applied to the motor 6 so that the main spindle 3 rotates at the rotation speed instructed by the NC device 9.

The NC device 9 is connected to a memory section 10 which stores processing and other programs, and also, to a fluctuation value setting section 11 having a monitor 12 (a display section). The NC device 9 conducts the cutting by feeding the tool (not shown) in the axial and radial directions of the rotary shaft of the workpiece W according to the processing program stored in the memory section 10 while rotating the main spindle 3.

Figure 2:
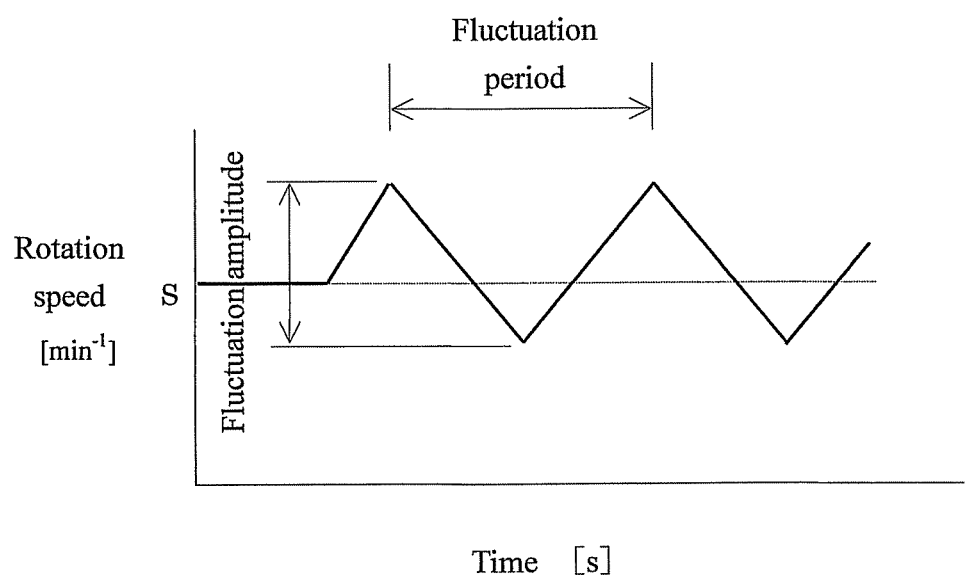
FIG. 2 is a chart showing an exemplary rotation speed fluctuation of the main spindle according to embodiment 1.

More specifically, as shown in FIG. 2, the rotation speed of the main spindle 3 can be fluctuated at the instructed fluctuation amplitude and fluctuation period through the NC device 9 and the main spindle control section by entering the rotation speed and its fluctuation amplitude and fluctuation period of the main spindle 3 from the monitor 12 having an input unit to the fluctuation value-setting section 11. In other words, the NC device 9 and the fluctuation value-setting section 11 constitute a rotation speed-fluctuating unit, and this rotation speed-fluctuating unit together with the memory section 10 and the monitor 12 constitute a monitor apparatus 13.

Figure 3:
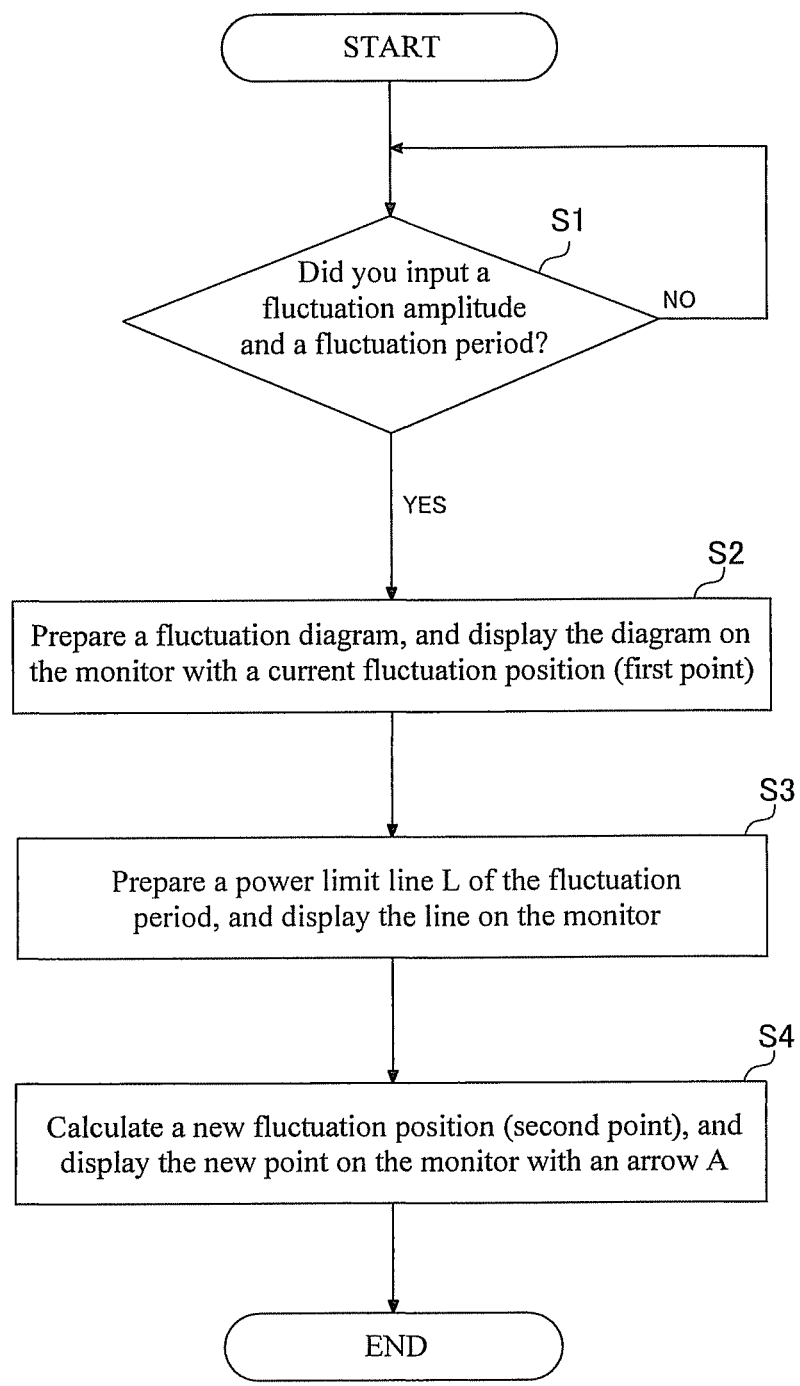
FIG. 3 is a flow chart showing the monitoring method according to embodiment 1.

Next, monitoring of the rotation speed of the main spindle by this monitor apparatus 13 is described by referring to the flow chart of FIG. 3.

Figure 4:
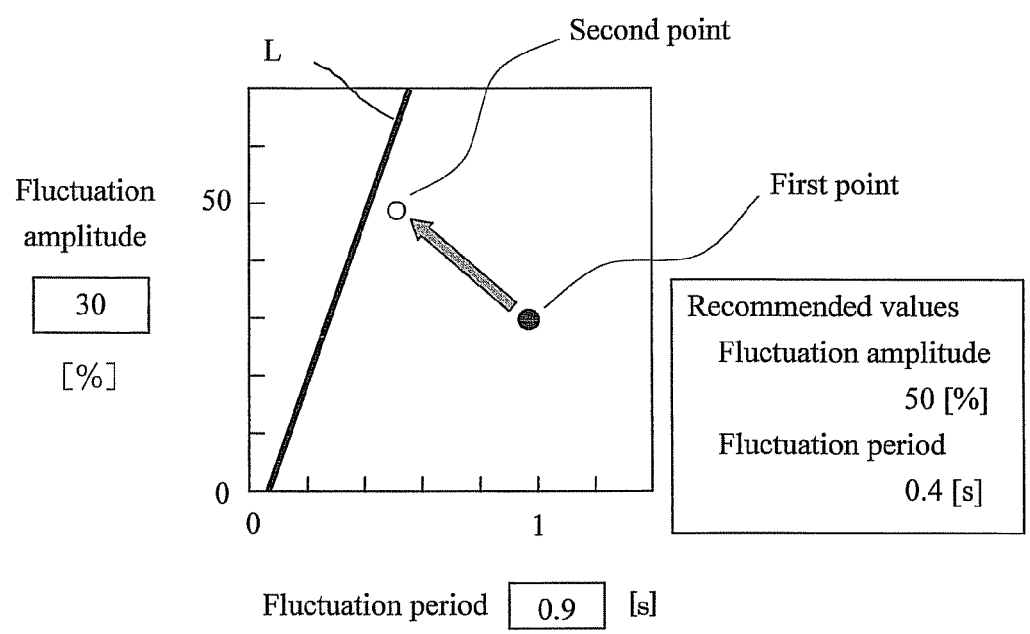
FIG. 4 is a chart showing the monitor display according to embodiment 1.

First, when the fluctuation amplitude and fluctuation period are entered in the fluctuation value-setting section 11 in S1, a fluctuation diagram shown in FIG. 4 is prepared and displayed on the monitor 12 in S2 (first displaying step). The fluctuation diagram is a graph showing the fluctuation amplitude in relation to the fluctuation period, wherein y-axis shows the fluctuation amplitude used for fluctuating the rotation speed and x-axis shows the fluctuation period. This graph also shows a current fluctuation amplitude and fluctuation period that had been set (namely, the current fluctuation position) as a first point and shown on the graph by a black circle. The operator can change the values of the fluctuation amplitude and the fluctuation period by entering these values through direct pointing of the position on the graph or by the use of a numeric keypad (not shown).

Next, in S3, a power limit line L is shown on the graph (power limit line-displaying step). Since excessive electric current applied to the motor 6 results in the temperature increase and damage of the motor 6, there is an upper limit for the electric current applied to the motor 6. This means that the fluctuation may not be realized at the entered values when a large value is instructed for the fluctuation amplitude of the rotation speed and a small value is instructed for the fluctuation period of the rotation speed. Accordingly, in the fluctuation value-setting section 11, a limit for the instructable fluctuation amplitude and fluctuation period that is determined by the maximum power that can be applied to the motor 6, namely, a power limit line L of the fluctuation period is calculated by the following equation (2) and indicated on the graph. Then, the rotation speed can be fluctuated as instructed if the values instructed are in the area right to this power limit line L. The equation (2) means that the maximum power applied to the motor 6 from which the power used for the cutting and the power lost by the abrasion and the like of the main spindle rotation has been subtracted can be used for the fluctuation of the main spindle rotation speed.

$$Q = \frac{45000}{\pi^2 S^2 J}(P - Pc)R \qquad (2)$$

[Q: amplitude of the rotation speed fluctuation [%], R: period of the rotation speed fluctuation [s], S: rotation speed of the rotary shaft [min$^{-1}$], J: inertia of the rotary shaft [kg·m$^2$], P: maximum power applied to the motor [W], Pc: sum of cutting power and power loss [W]]

Figure 5:
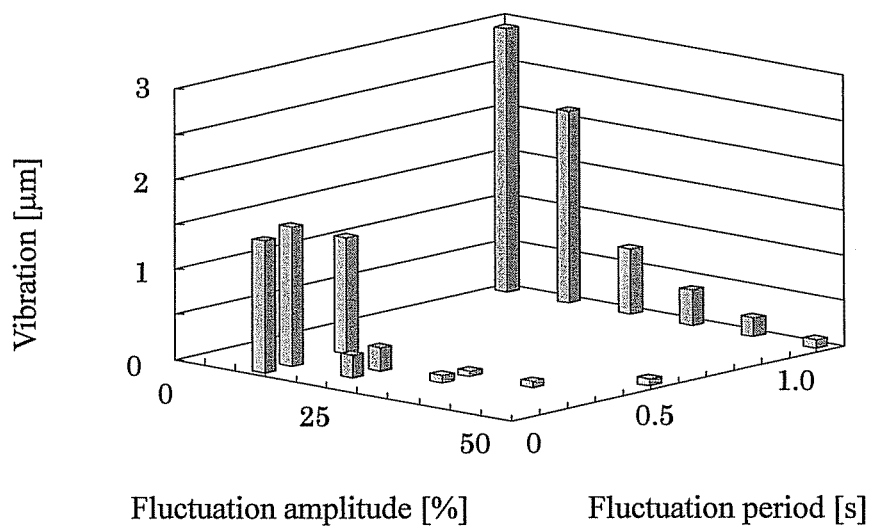
FIG. 5 is a chart explaining the experimental result of the fluctuation of the main spindle rotation speed in the embodiment 1.

In the meanwhile, as described in the section of "background of the invention", it is well known that the effect of suppressing the chatter vibration can be achieved by fluctuating the rotation speed of the main spindle 3. FIG. 5 is a graph showing the result of the experiment wherein the cutting has been conducted while fluctuating the rotation speed of the main spindle 3. As evident from FIG. 5, a higher chatter vibration suppression effect can be realized by reducing the fluctuation period and increasing the fluctuation amplitude.

Accordingly, in S4, the fluctuation value-setting section 11 calculates a new fluctuation position which has a shorter fluctuation period and a larger fluctuation amplitude than the first point in the area on the right side of the power limit line for the fluctuation period, in addition to the first point which is the current fluctuation position (fluctuation position-calculating step), and the calculated fluctuation position is shown as a second point on the graph by a blank circle. An arrow A guiding the second point from the first point is also shown on the graph (second displaying step). Also shown on right side of the graph are the values for the second point (recommended values).

Accordingly, the operator can readily set a new fluctuation position which is more likely to be capable of suppressing the chatter vibration by taking the arrow A and the second point shown in the graph into consideration.

This calculation of the second point can be conducted, for example, by calculating a line extending from the position of the first point to the side of the shorter period and a larger amplitude at a predetermined slope, finding the intersection of this line with the power limit line L, and choosing the second point on the interior side of the power limit line L at a sufficient distance from the power limit line L; or finding a plurality of fluctuation positions by changing the fluctuation amplitude and the fluctuation period by a predetermined percentage, and selecting the fluctuation position which is below and closest to the power limit line L.

As described above, in the monitor apparatus 13 for monitoring the main spindle rotation speed according to the embodiment 1, the operator can readily select the values for fluctuating the rotation speed even if two values, namely, the fluctuation amplitude and the fluctuation period are to be set, since the fluctuation value-setting section 11 comprises a diagram-preparing unit which prepares and displays the graph showing the fluctuation amplitude in relation to the fluctuation period of the rotation speed on the monitor 12; a first displaying unit which displays current fluctuation position (first point) on the graph; a power limit line-displaying unit which prepares and displays power limit line L of the fluctuation period of the motor 6 based on the equation (2); a fluctuation position-calculating unit which calculates new fluctuation position (second point) not exceeding the power limit line but with a larger fluctuation amplitude and/or a shorter fluctuation period compared with the current fluctuation position; and a second displaying unit which displays the new fluctuation position on the graph with the guide of the change from the current fluctuation position. Accordingly, the operator can quickly and readily find the processing condition optimal for suppressing the chatter vibration.

It is to be noted that, in the embodiment 1 as described above, the second point is calculated and shown as guidance on the graph as an embodiment wherein both the fluctuation amplitude and the fluctuation period are changed. However, the new fluctuation position may be selected by using a fixed fluctuation amplitude and a shorter fluctuation period. For example, in the embodiment shown in FIG. 6, a third point on the power limit line L has a fluctuation amplitude which is the same as the first point, and an arrow A from the first point to the third point as well as the recommended values (values of the third point) are displayed. The fluctuation period of this third point can be determined from the equation (2) by substituting the fluctuation amplitude of the first point in the equation (2).

When the new fluctuation position is on the power limit line L and has a fluctuation amplitude which is the same as the current fluctuation position, a significant effect of suppressing the chatter vibration is realized due to the short fluctuation period. Also, due to the use of the same fluctuation amplitude, and hence, the same difference between the maximum and the minimum cutting speed, loss of surface precision due to the cutting speed difference is minimized.

Figure 6:
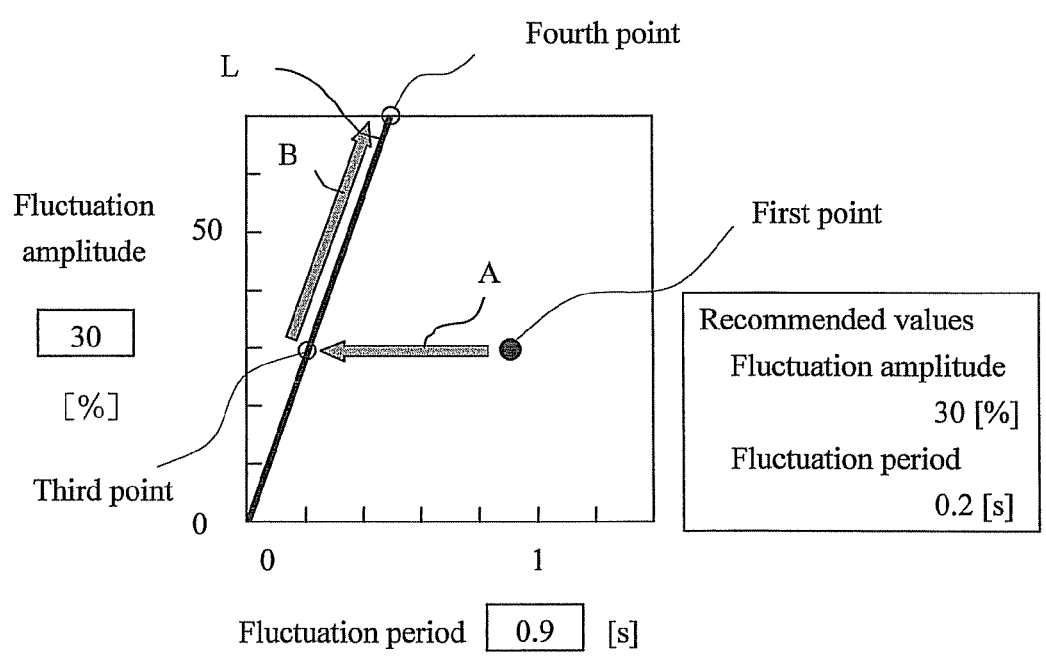
FIG. 6 is a chart explaining a modification of the monitor display of the embodiment 1.

FIG. 6, however, shows a next guiding arrow in case the chatter vibration is not suppressed at the third point. More specifically, a fourth point is at the intersection of the power limit line L of the fluctuation period with the maximum fluctuation amplitude, and an arrow B from the third point to the fourth point is also displayed. The fluctuation period at the fourth point is calculated from the equation (2) by substituting the value of the maximum fluctuation amplitude into the equation (2). This fourth point has a larger difference in the cutting speed than the third point, and therefore, the surface may be damaged by the processing. However, due to the larger fluctuation amplitude, the fourth point has higher effect of chatter vibration suppression. If immediate suppression of the chatter vibration is desired, the third point may be omitted, and an arrow starting from the first point and ending at the fourth point may be displayed.

When the new fluctuation position is on the power limit line L and at a position where the fluctuation amplitude is at its maximum as described above, effective chatter vibration suppression is expected.

Embodiment 2

Next, another embodiment of the present invention is described. General constitution of the NC lathe 1 including the monitor apparatus 13 and the monitoring procedure are common to those of the Embodiment 1 despite difference in the display of the monitor in the fluctuation value-setting section 11. Accordingly, the monitor display is mainly described while omitting the repetitive descriptions.

In the embodiment 1 as described above, the fluctuation period was used for the value fluctuated. However, monitoring and fluctuation of the rotation speed of the main spindle 3 can also be accomplished by using angular acceleration for the fluctuation of the rotation speed of the main spindle 3. Angular acceleration represents change in the rotation speed per time, and the relation of the rotation speed S, the fluctuation period R, and the fluctuation amplitude Q of the main spindle 3 is as shown below in the equation (3). As explained for FIG. 5 that the effect of the chatter vibration suppression is more significant at shorter fluctuation period, the effect of the chatter vibration suppression can be enhanced by using a higher angular acceleration as in the case of the shorter fluctuation period.

$$\dot{\omega} = \frac{\pi S}{1500 R} Q \quad (3)$$

$\dot{\omega}$: angular acceleration [rad/s²]

Figure 7:
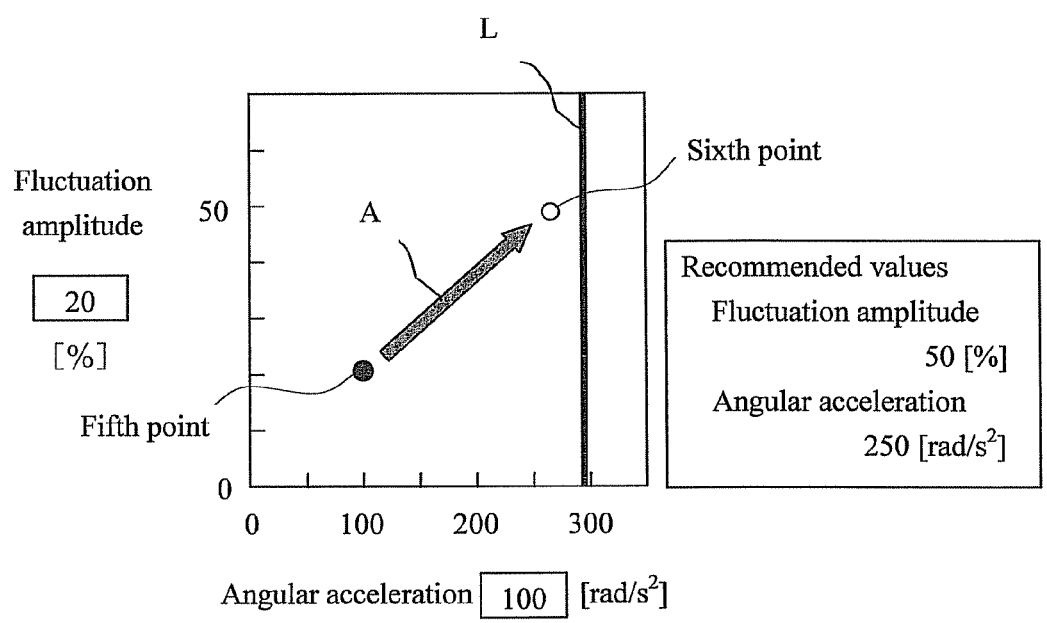
FIG. 7 is a chart showing the monitor display according to embodiment 1.

Accordingly, in this monitor apparatus 13, when the fluctuation amplitude and the angular acceleration are entered in the fluctuation value-setting section 11, fluctuation diagram shown in FIG. 7 is prepared and displayed on the monitor 12 (first displaying step). The graph shows the fluctuation amplitude (y-axis) in relation to the angular acceleration (x-axis).

In this graph, power limit line L of the angular acceleration is calculated from the following equation (4) by taking equations (2) and (3) into consideration, and shown on the graph (power limit line-displaying step). Then, the rotation speed can be fluctuated by the values of the angular acceleration instructed in the area left to this power limit line L.

$$\dot{\omega} = \frac{30}{\pi S J}(P - P_c) \quad (4)$$

The fluctuation value-setting section 11 displays a fifth point which is the current fluctuation position by a black circle. The fluctuation value-setting section 11 also calculates a sixth point which has a larger angular acceleration and a larger fluctuation amplitude than the fifth point in the area to the right side of the power limit line for the angular acceleration (fluctuation position-calculating step), and the calculated fluctuation position is shown as the sixth point on the graph by a blank circle. An arrow A guiding the sixth point from the fifth point is also shown on the graph (second displaying step). Also shown on right side of the graph are the values for the sixth point (recommended values).

Accordingly, the operator can readily set a new fluctuation position which is more likely to be capable of suppressing the chatter vibration by taking the arrow A and the sixth point shown in the graph into consideration.

As described above, in the monitor apparatus 13 for monitoring the main spindle rotation speed according to the embodiment 2, the operator is capable of readily selecting the values for fluctuating the rotation speed even if two values, namely, the fluctuation amplitude and the angular acceleration are to be set, since the fluctuation value-setting section 11 comprises a diagram-preparing unit which prepares and displays the graph showing the fluctuation amplitude in relation to the fluctuation period of the rotation speed on the monitor 12, a first displaying unit which displays current fluctuation position (fifth point) on the graph, a power limit line-displaying unit which prepares and displays power limit line L of the fluctuation period of the motor 6 based on the equation (4), a fluctuation position-calculating unit which calculates new fluctuation position (sixth point) not exceeding the power limit line but with a larger fluctuation amplitude and/or a larger angular acceleration compared with the current fluctuation position, and a second displaying unit which displays the new fluctuation position on the graph with the guide of the change from the current fluctuation position. Accordingly, the operator can rapidly and readily find the processing condition optimal for suppressing the chatter vibration.

It is to be noted that, in the embodiment 2, the new fluctuation position may be selected by using a fixed fluctuation amplitude and significantly changing the fluctuation period. For example, in the embodiment shown in FIG. 8, a seventh point on the power limit line L has a fluctuation amplitude which is the same as the fifth point, and an arrow A from the fifth point to the seventh point as well as the recommended values (values of the seventh point) are displayed.

When the new fluctuation position is on the power limit line L and has a fluctuation amplitude which is the same as the current fluctuation position, a large effect of suppressing the chatter vibration is realized due to the short fluctuation period. Also, due to the use of the same fluctuation amplitude, and hence, the same difference between the maximum and the minimum cutting speed, loss of surface precision due to the cutting speed difference is minimized.

Figure 8:
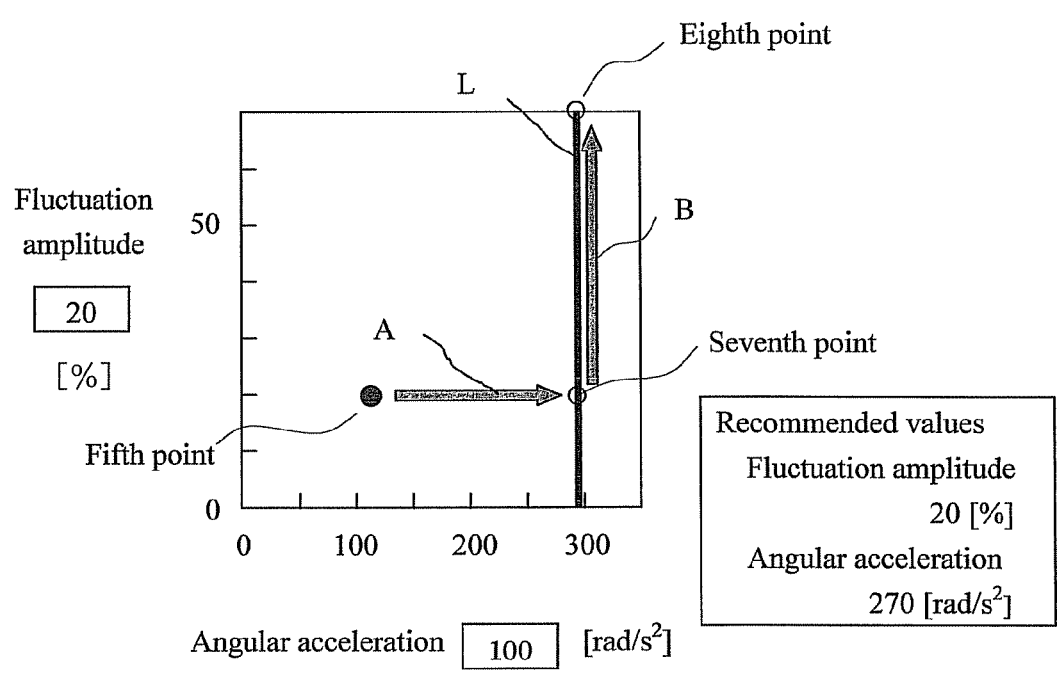
FIG. 8 is a chart explaining a modification of the monitor display of the embodiment 2.

FIG. 8, however, shows next guiding arrow in case the chatter vibration is not suppressed at the seventh point. More specifically, an eighth point is at the intersection of the power limit line L of the angular acceleration with the maximum fluctuation amplitude, and an arrow B from the seventh point to the eighth point is also displayed. This eighth point has a larger difference in the cutting speed than the seventh point, and therefore, and the surface may be damaged by the processing. However, due to the larger fluctuation amplitude, the eighth point has high effect of chatter vibration suppression. If immediate suppression of the chatter vibration is desired, the seventh point may be omitted, and an arrow starting from the fifth point and ending at the eighth point may be displayed.

When the new fluctuation position is on the power limit line L and at a position where the fluctuation amplitude is at its maximum, effective chatter vibration suppression is expected.

In both embodiments 1 and 2, when the graph is displayed on the monitor, the power limit line, the new fluctuation position, and the guide arrow are automatically calculated and displayed on the graph. However, these may be separately displayed at any timing by the input unit in the fluctuation value-setting section. Of course, the embodiments of the graph are not limited to those as described above, and the graph may be altered by exchanging the x- and y-axis or by displaying in three dimensional graphs.

Also, indication of the fluctuation position is not limited to the circle, and markers having other shapes may also be selected, and it is also possible to use markers having different shapes for the current fluctuation position and the new fluctuation position. The guide indication is also not limited an arrow, and any adequate indication may be used as long as the new fluctuation position is suggested. For example, an on-and-off marker indicating the current fluctuation may be combined with an repetitively displayed indication guiding to a new fluctuation position.

However, the indication of the new fluctuation position and the guide indication are not always necessary. Only the current fluctuation position and the power limit line may be displayed on the monitor so that the operator can adequately select new fluctuation position at a position below the power limit line and having a higher fluctuation amplitude and/or a shorter fluctuation period (or a higher fluctuation amplitude and/or a higher angular acceleration) than the current fluctuation position. Such indication also allows the operator to readily select the value for the rotation speed fluctuation based on the current fluctuation position and the power limit line on the graph.

In addition, while the embodiments of fluctuating the fluctuation amplitude in combination with the fluctuation period or the angular acceleration, only the fluctuation period, and only the angular acceleration have been described for the embodiments 1 and 2, it is also possible to solely change the fluctuation amplitude.

In the embodiments 1 and 2, the workpiece is processed by fluctuating the rotation speed from the start of the processing. However, when the workpiece is processed by using a machine tool having a (conventional) detection unit which detects the occurrence of the chatter vibration by comparing the vibration of the main spindle detected by a vibration sensor with the predetermined threshold, it is also possible to first rotate the main spindle at a constant speed, and, when the occurrence to the chatter vibration is detected by the detection unit, to fluctuate the rotation speed by entering the fluctuation amplitude and the fluctuation period or the angular acceleration of the rotation speed in the fluctuation value-setting section and display the a fluctuation diagram such as a graph on the monitor.

Embodiment 3

Figure 9:
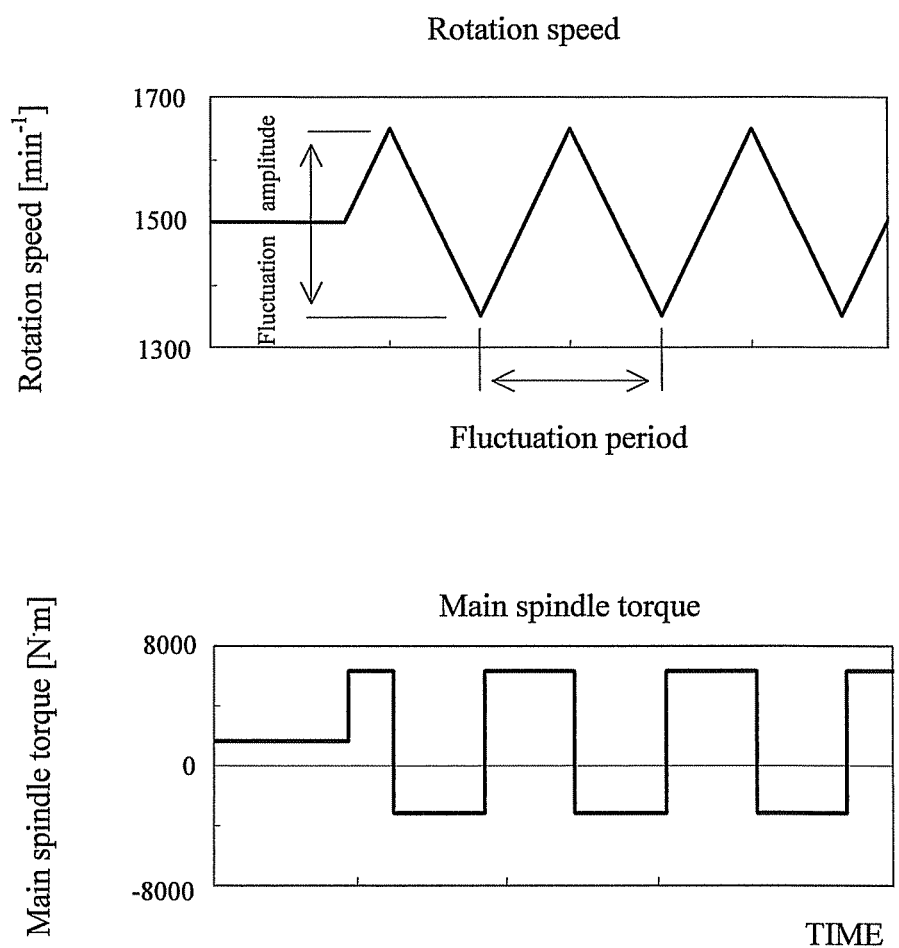
FIG. 9 is charts explaining fluctuation of the rotation speed and the main spindle torque in the embodiment 3.

In this embodiment 3, constitution of the NC lathe 1 is the same as that of the embodiments 1 and 2. The monitor 12 constitutes the display unit, and the fluctuation value-setting section 11 constitutes the fluctuation value setting unit. The rotation speed of the main spindle 3 can be fluctuated at the instructed fluctuation amplitude and fluctuation period as shown in FIG. 9 by entering the rotation speed and its fluctuation amplitude and fluctuation period of the main spindle 3 from the monitor 12 having an input unit to the fluctuation value-setting section 11, and controlling the main spindle 3 via the NC device 9 (the rotation speed-fluctuation unit) and the spindle controlling section 8.

Figure 10:
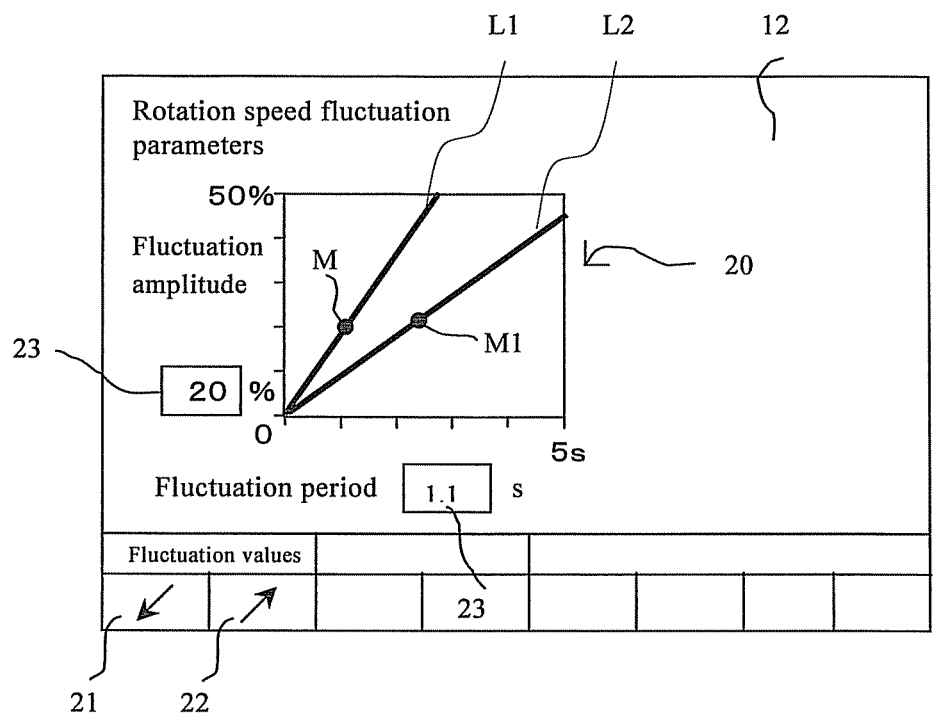
FIG. 10 is a chart showing the monitor display according to embodiment 3.

When the fluctuation amplitude and fluctuation period are entered in the fluctuation value-setting section 11, the monitor 12 displays a graph 20 wherein the fluctuation amplitude (y-axis) is shown in relation to the fluctuation period (x-axis) as shown in FIG. 10. This graph also shows current fluctuation amplitude and fluctuation period that had been set (namely, the current fluctuation position) by the black marker M.

In addition, button 21 with a left-down-arrow and button 22 with a right-up-arrow are displayed on the monitor 12, and when the operator pushes one of these buttons, the position of the marker M moves in the direction of the arrow on the button. Windows 22 and 23 show values of the fluctuation amplitude and the fluctuation period at the position of the marker M.

However, in the fluctuation value-setting section 11, ratio of the fluctuation amplitude to the fluctuation period of the rotation speed is selected, and the fluctuation amplitude and the fluctuation period are simultaneously set based on this ratio. More specifically, the ratio of the fluctuation amplitude to the fluctuation period is a value determined by the rated power of the motor 6, the cutting power, percentage used in relation to the rated power of the motor 6, average rotation speed, and inertia of the main spindle 3, for example, a value satisfying the following equation (5). In this case, the power of the motor 6 is fluctuated by setting the percentage of the motor power to the rated power since the electric current flowing in the motor 6 increases with the fluctuation of the rotation speed, and increased heat generation may cause heat displacement.

$$\frac{Q}{R} = \frac{45000}{\pi^2 S^2 J}(0.01ePn - Pc) \quad (5)$$

Q: fluctuation amplitude of the rotation speed [%], R: fluctuation period of the rotation speed [s], S: average rotation speed [min$^{-1}$], J: inertia of the main spindle [kg·m$^2$], Pn: rated power of the motor [W], Pc: cutting power [W] e: percentage used [%]

Of these, the cutting power Pc can be calculated from the fluctuated main spindle torque once the fluctuation is started. The relation between the time and the rotation speed and the relation between the time and the main spindle during the rotation speed fluctuation is evident from FIG. 9, and a large torque is required during the acceleration and deceleration of the rotation speed of the main spindle 3. The main spindle torque during the acceleration and deceleration has equal amplitude from the cutting torque at the center position. Accordingly, the cutting torque can be calculated as a median (average) of the main spindle torque during the acceleration and the main spindle torque during the deceleration. Since the torque and the power have the relation as represented by the following equation (6), the cutting torque can be converted into the cutting power. It is to be noted that the thus calculated value includes abrasion loss by the rotation of the main spindle 3, and this abrasion loss which is a small value has been omitted.

$$P = \frac{2\pi}{60}T \quad (6)$$

P: motor power [W], T: torque of the motor [N·m]

When the calculated cutting power is, for example, 2 kW, the rated power is 8 kW, the inertia is 0.5 k·m$^2$, the rotation speed is 1500 min$^{-1}$, the power during the fluctuation is 80% of the rated power, the fluctuation period satisfying the equation (5) is 1.1 s when the fluctuation amplitude is 20%.

The graph 20 shows the line L1 representing the ratio of the equation (5), and for example, when the right up arrow button 22 is pushed, the marker M moves along the line L1 in the direction of the longer period and larger amplitude at a distance corresponding to the amplitude modification, and the value after the fluctuation is displayed in the window 23. for example, when the predetermined fluctuation amplitude is 5%, and the right up arrow button 22 is pushed once, the new fluctuation amplitude will be 25%, and the fluctuation period will be 1.4 s as determined by the equation (5). When the selection button (not shown) is pushed, the fluctuation value is transmitted to the NC device 9, and the rotation speed of the main spindle 3 is fluctuated by fluctuation values shown in the window 23.

In general, when the power of the motor 6 is equal and the fluctuation amplitude is different, the effect of suppressing the chatter vibration is higher at the lower fluctuation amplitude. However, a larger fluctuation amplitude means larger difference in the rotation speed between the higher speed and the lower speed, and this may cause undesirable stripe pattern on the surface being processed. Accordingly, the operator preferably regulates the rotation speed by pushing the right up arrow button 22 during the occurrence of the chatter vibration and the left down arrow button 21 when the chatter vibration is not occurring.

The fluctuation value-setting section 11 repetitively calculates the ratio of the fluctuation amplitude to the fluctuation period with the change of each parameter in the equation (5) to revise the line L1. For example, a higher cutting power is required when the workpiece W has greater machining allowance, and the slope of the line L1 will be reduced and the line L1 will be the line L2. When the right up arrow button 22 is pushed at this moment, the marker M moves along the line L2 from the starting M1 at the intersection of the current fluctuation and the line B (the point satisfied the newly calculated equation (5)) the predetermined fluctuation amplitude value in the direction of longer period and larger amplitude.

As described above, in the case of the NC lathe 1 according to the embodiment 3, the fluctuation value-setting section 11 selects the ratio of the fluctuation amplitude to the fluctuation period, the fluctuation amplitude and the fluctuation period are simultaneously instructed based on the ratio. Accordingly, two parameters, namely, the fluctuation amplitude and the fluctuation period can be set in one step. As a consequence, the operator can readily determine the fluctuation values for fluctuating the rotation speed of the main spindle 3 irrespective of the experience of the operator.

In this embodiment, the fluctuation value-setting section 11 determines the ratio of the fluctuation amplitude to the fluctuation period by the equation (5) using the rated power of the motor 6, the cutting power, percentage used in relation to the rated power of the motor 6, average rotation speed, and inertia of the main spindle 3, and therefore, the fluctuation values are determined while avoiding flow of excessive electric current through the motor 6, and occurrence of thermal disposition by the heat generated in the motor 6 is thereby by prevented.

In addition, since the fluctuation value-setting section 11 has the monitor 12 which displays the graph 20 showing the fluctuation amplitude in relation to the fluctuation period, and the graph 20 shows the position of the current fluctuation amplitude and fluctuation period (marker M) and lines L1 and L2 corresponding to the ratio of the fluctuation amplitude to the fluctuation period, the current fluctuation value and the new fluctuation value can be easily recognized, and the fluctuation value can be readily instructed.

The ratio of the fluctuation amplitude to the fluctuation period is not limited to the one defined the equation (5). For example, when the cutting power is deemed as substantially constant and the rotation speed is fluctuated at the motor power equivalent to current motor power, the values may be simultaneously fluctuated to satisfy the following equation (7):

$$\frac{Q}{R} = k \qquad (7)$$

Q: fluctuation period of the rotation speed [%], R: fluctuation period of the rotation speed [s], k: constant.

The constant k is calculated by substituting the current fluctuation amplitude and fluctuation period. When the left down arrow button 21 or the right and up arrow button 22 is pushed once, the constant k is calculated from the current values, and the fluctuation values are changed to those satisfying the equation (7). For example, when the right up arrow button 22 is pushed, the position moves in the direction of the longer period and larger amplitude at a distance corresponding to the amplitude modification, and the value after the fluctuation satisfies the equation (7). The line of the equation (7) is also displayed on the graph.

As described above, when the cutting power can be regarded as substantially constant, the relation of the fluctuation amplitude to the fluctuation period is simple linear relation. Therefore, stable fluctuation values can be obtained by pushing the arrow button even if the cutting power became unstable by one reason or another.

In the embodiment 3, when the graph is displayed on the monitor, the marker indicating the current fluctuation values and the line for the ratio are automatically calculated and displayed on the graph. However, these may be separately displayed at any timing by the input unit on the monitor. Off course, the embodiments of the graph are not limited to those as described above, and the graph may be altered by exchanging the x- and y-axis or by displaying in three-dimensional graphs. In addition, display of the graph, the marker, and the line indicating the ratio is not critical, and the current fluctuation value and the new fluctuation value may be indicated only by numerical values.

Furthermore, in the embodiments as described above, the fluctuation values are first selected on the monitor by using the selection button, and then the rotation speed fluctuation is conducted by the rotation speed-fluctuation unit by pressing the selection button. However the fluctuation of the rotation speed can be automatically conducted with the selection of the fluctuation values.

Embodiment 4

Figure 11:
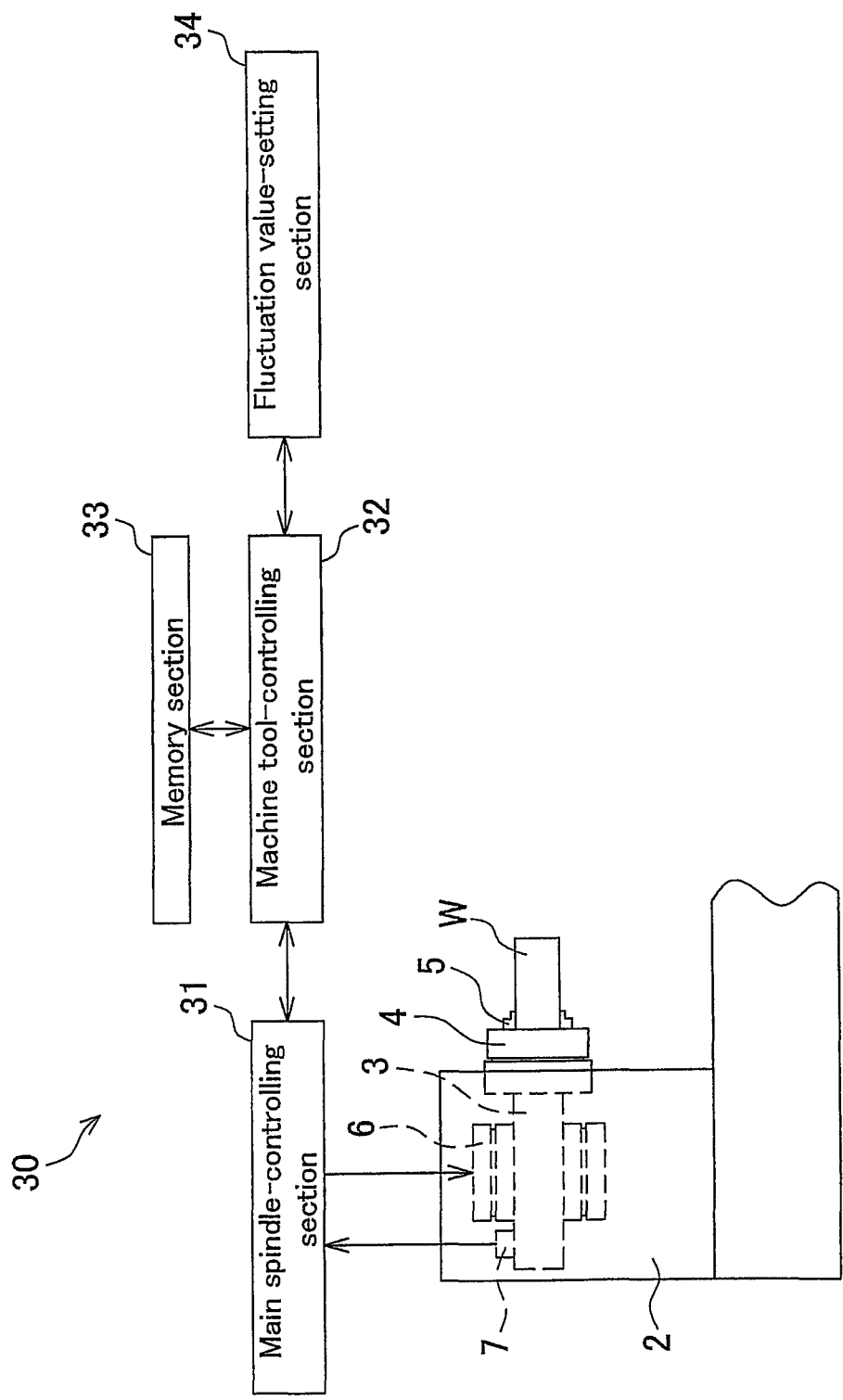
FIG. 11 is a schematic view of NC lathe of embodiment 4.

NC lathe 30 shown FIG. 11 also has the chuck 4 having the claw 5 at the end of the main spindle 3. The main spindle 3 is rotatably supported by the headstock 2, and a motor 6 for rotating the main spindle 3 and an encoder 7 for detecting the rotation speed of the main spindle 3 are accommodated in the headstock 2.

Figure 12:
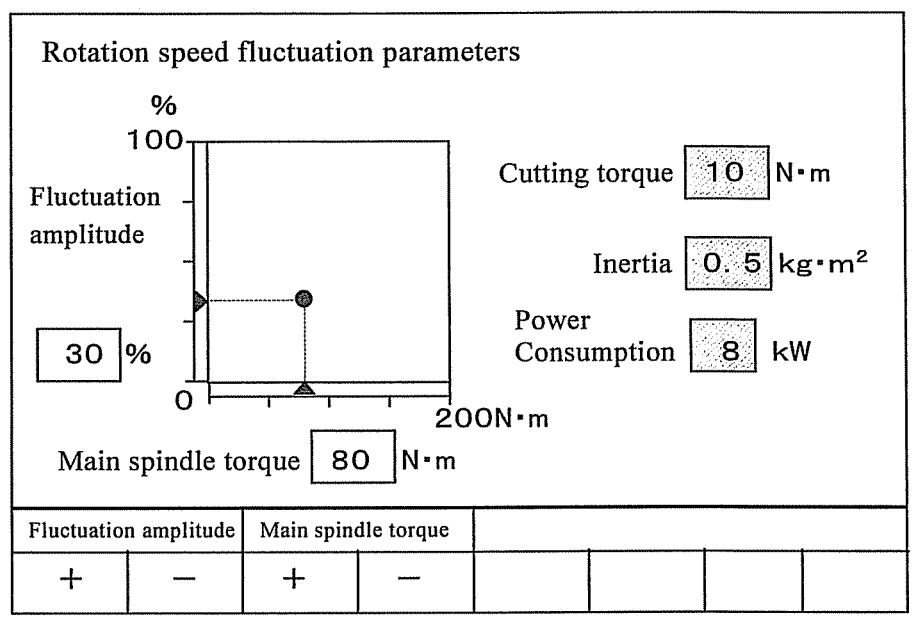
FIG. 12 is a chart explaining an exemplary display of the parameters in the fluctuation value-setting section of the embodiment 4.

31 is a main spindle-controlling section functioning as a rotation speed-fluctuating unit which monitors the rotation speed of the main spindle 3 by the encoder 7 and regulates power supplied to the motor 6 to thereby control the rotation speed of the main spindle 3. 32 is a machine tool-controlling section functioning as a rotation speed-fluctuating unit for controlling the entire lathe 30. The machine tool-controlling section 32 is connected to a main spindle controlling section 31, a memory section 33 which functions as a memory unit for memorizing the processing program, and a fluctuation value-setting section 34 which functions as a control unit for selecting the parameters for fluctuating the rotation speed of the main spindle 3 (namely, the main spindle torque and the amplitude). In addition to the control of the rotation speed of the workpiece by the main spindle controlling section 31, the step of cutting of the surface of the rotating workpiece W with the tool, and moving the workpiece W or the tool in the axial and/or radial direction of the rotary shaft are regulated by conventional mechanisms. As shown in FIG. 12, the fluctuation value-setting section 34 is constituted from a touch panel, and this also functions as the display unit.

In the lathe 30, power is supplied to the motor 6 according to the processing program in the memory section 33 and under the control of the main spindle controlling section 31 to thereby rotate the main spindle 3 at the predetermined instructed rotation speed, and the turning operation is conducted by cutting the surface of the tool with the tool. When the chatter vibration occurs during the processing, the rotation speed of the main spindle 3 is fluctuated based on the current rotation speed according to the predetermined embodiment in order to suppress the chatter vibration. In this instance, the operator instructs predetermined parameters in the fluctuation value-setting section 34, and then, the machine tool controlling section 32 instructs the main spindle controlling section 31 based on the instructed parameters to thereby fluctuate the rotation speed of the main spindle 3. The main spindle controlling section 31 then fluctuates the rotation speed of the main spindle 3 based on the instruction and attempts to suppress the chatter vibration. The lathe 30 may also be constituted so that the rotation speed corresponding to the intended fluctuation or the power applied to the motor 6 is directly instructed from the tool controlling section 32 to the main spindle controlling section 31. Furthermore, since the power applied P and the main spindle torque T has the relation of the following equation (8), it is also possible to instruct the main spindle torque T from the machine tool controlling section 32 to the main spindle controlling section 31 to thereby control the rotation speed of the main spindle 3. In the equation (8), S represents the rotation speed.

$$P = \frac{\pi S}{30} T \qquad (8)$$

Next, an embodiment wherein the main spindle torque and the amplitude are used for the parameters to fluctuate the rotation speed is described in detail by referring to FIG. 12. First, the maximum main spindle torque determined by the power that can be applied to the motor 6 is 200 N·m, and the main spindle torque which is one of the parameters is set at 80 N·m below the maximum main spindle torque. In the meanwhile, maximum amplitude of the rotation speed is 100%, and the amplitude which is one of the parameters is set at 30% below the maximum amplitude. The operator enters these values in the fluctuation value-setting section 34 by touching the "+" or "−" at the bottom of the display screen. Then, the entered values are displayed as a black circle on the screen in the plane where the y-axis and the x-axis are each parameters. The maximum main spindle torque is also shown on the plane as a line to define the area which can be used for setting the main spindle torque so that the operator will be incapable of setting a main spindle torque exceeding the maximum main spindle torque.

When the parameter values are entered as described above, the machine tool controlling section 32 instructs the main spindle controlling section 31 so that the rotation speed of the main spindle 3 is fluctuated with the main spindle torque during the rotation speed fluctuation is 80 N·m and the amplitude is 30% (i.e. ±15%). (In this step, the value instructed may the rotation speed as described above, or alternatively, the main spindle torque or the power applied). Accordingly, when the instructed rotation speed is, for example, 1000 min$^{-1}$, the main spindle controlling section 31 accelerates the main spindle torque at 80 N·m until the rotation speed of the main spindle 3 detected by the encoder 7 reaches 1150 min$^{-1}$ (+15%). In this step, the angular acceleration of the main spindle 3 during the acceleration is calculated by differentiating the rotation speed, and the calculated result is temporarily stored in the machine tool controlling section 32. When the rotation speed reaches 1150 min$^{-1}$, the machine tool controlling section 32 instructs the main spindle controlling section 31 so that the absolute value of the angular acceleration during the deceleration is equal to the absolute value of the angular acceleration during the acceleration, and the main spindle controlling section 31 controls the main spindle torque so that the absolute value of the angular acceleration during the acceleration and the deceleration is equal and the deceleration is continued until the rotation speed of the main spindle reaches 850 min$^{-1}$ (−15%). The processing is completed at this point. Or, the machine tool controlling section 32 and the main spindle controlling section 31 repeats the procedure as described above to fluctuate the rotation speed of the main spindle 3 until new parameter values are set.

As described above, the relation between the time and the rotation speed and the relation between the time and the main spindle torque during the fluctuation of the rotation speed of the main spindle 3 are shown in FIG. 9. As evident from FIG. 9, a large main spindle torque is required when the rotation of the main spindle 3 is accelerated and decelerated. Accordingly, when the absolute value of the angular acceleration of the main spindle 3 during the acceleration is consistent with the absolute value of the angular acceleration of the main spindle 3 during the acceleration, the main spindle torque has equal amplitude from the cutting torque at the center position, and the acceleration time and the deceleration time of the rotation speed of the main spindle 3 will be equal. In addition, the cutting torque can be calculated as a median (average) of the main spindle torque during the acceleration and the main spindle torque during the deceleration as described above. Furthermore, the period of the rotation speed fluctuation can be determined from how the rotation speed, and since the amplitude and the main spindle torque are known, these values with the rotation speed detected by the encoder 7 and the cutting torque can be substituted into the equation (1) to calculate inertia J. The fluctuation value-setting section 34 then shows the cutting torque, the inertia, and the power applied (power consumption) detected in the main spindle controlling section 31 as shown in FIG. 12. While the inertia is calculated by using the period and the amplitude, the inertia can also be calculated by using angular acceleration of the main spindle 3.

In the lathe 30 as described above, the rotation speed of the main spindle 3 is fluctuated by using the amplitude of the rotation speed and the main spindle torque for the parameters, as opposed to the conventional lathe using the amplitude and the period for the parameters. In other words, the main spindle torque with clear maximum value is used for the parameter, and this enables clear notification to the operator of the possible parameter range that can be used in the fluctuation value-setting section 34. Accordingly, the operator can readily realize the fluctuation of the rotation speed effective for suppressing the chatter vibration without setting an unrealizable fluctuation.

In addition since the area where each parameter can be set and the current values are shown on the plane defined by the amplitude (y-axis) and the main spindle torque (x-axis) in the fluctuation value-setting section 34, the operator can readily grasp the current situation, and also, the area where each parameter can not be set, and this enables more effective suppression of the chatter vibration.

Furthermore, in the fluctuation value-setting section 34, the cutting torque, the inertia, and the power applied calculated or detected are displayed on the monitor, the processing conditions can be numerically grasped, and the energy consumption is also readily monitored.

Still further, although the rotation speed fluctuation results in the inconsistency of the surface processed, the operator can suppress the chatter vibration in the possible extent while confirming the applied power displayed on the fluctuation value-setting section 34. The operator can also grasp the fluctuation rate of the rotation speed and precise fluctuation of the amplitude. This enables minimization of the surface inconsistency.

The machine tool of the present invention is not limited to the embodiments as described above, and the parameters for fluctuating the rotation speed, the fluctuation value-setting section, and the constitution of the entire machine tool can be adequately modified without deviating from the intention of the present invention.

For example, in the embodiment as described above, the amplitude and the main spindle torque are used as the parameters for fluctuating the rotation speed of the main spindle 3. However, the power applied can be used instead of the main spindle torque. In this case, the applied power that has been set may be substituted into the equation (8) for conversion into the main spindle torque, and then, the control as in the case of the embodiment as described above may be conducted in the machine tool controlling section 32. In this control, as opposed to the conventional embodiment using the amplitude and the period for the parameters, the applied power with clear maximum value is used for the parameter, and this has the merit of clear notification to the operator of the possible parameter range that can be used in the fluctuation value-setting section 34.

In addition, the fluctuation value-setting section 34 may also be constituted so that the operator can adequately select whether the parameter used is the main spindle torque or the power applied, and such constitution will facilitate smooth operation.

Furthermore, the period of the rotation speed fluctuation may be employed instead of the amplitude. When the period is used, and 2 seconds is used for the period and 80 N·m is used for the main spindle torque in the fluctuation value-setting section 34, the rotation speed of the main spindle 3 is accelerated at the main spindle torque of 80 N·m for the half the period, namely, for 1 second. In this step, the angular acceleration is stored in the machine tool controlling section 32 as in the case of the embodiment as described above, and next, the rotation speed of the main spindle 3 is decelerated at the main spindle torque such that the absolute value of the angular acceleration is the same as the one used in the acceleration for half the period, namely, for 1 second to thereby conduct the control. As in the case of the embodiment as described above, this control procedure, as opposed to the conventional embodiment using the amplitude and the period for the parameters, has the merit that the operator will be clearly notified of the possible parameter range that can be used in the fluctuation value-setting section 34.

In addition, the fluctuation value-setting section 34 may also be constituted so that the operator can adequately select whether the parameter used is the amplitude or the period, and such constitution will facilitate smooth operation.

Instead of directly using the main spindle torque or the power applied, relative values such as some predetermined percentage of the maximum main spindle torque or the maximum applicable power may also be used with no problem. In addition, various parameter used in the operation may be stored in the memory section 33 in association with the type of the tool or the program used for the processing, and in the next operation using the same tool or program, the values that had been stored may be used from the start of the operation to thereby fluctuate the rotation speed of the main spindle 3 by the embodiment based on the same parameter as those used in the current operation to prevent the occurrence of the chatter vibration.

Furthermore, various parameters such as actual rotation speed during the fluctuation, the amount cut, the cutting torque, and the inertia as well as processing condition values may also be stored in the memory section 33 in addition to the main spindle torque, the power applied, the amplitude, and the period used. When these values are stored, these various values can be maintained as a processing database, and referred in the subsequent processing operations.

With regard to all embodiments as described above, the machine tool of the present invention is not limited to the NC lathe, and exemplary other embodiments include machine tools which conducts cutting at a fluctuated rotation speed such as machining center.

What is claimed is:

1. A method for monitoring rotation speed fluctuation of a rotary shaft of a machine tool having the rotary shaft driven by a motor after mounting a tool or a workpiece thereon, and a rotation speed-fluctuating unit for continuously fluctuating rotation speed of the rotary shaft at an arbitrary pattern; said monitoring being accomplished by a display section; wherein the method comprises
a diagram-preparing step in which a fluctuation diagram showing an amplitude of the rotation speed fluctuation in relation to a period of the rotation speed fluctuation is prepared for display on the display section;
a first displaying step in which a current fluctuation position is displayed on the fluctuation diagram; and
a power limit line-displaying step in which a power limit line for the fluctuation period of the motor is prepared based on the following equation:

$$Q = \frac{45000}{\pi^2 S^2 J}(P - Pc)R.$$

[Q: amplitude of the rotation speed fluctuation [%], R: period of the rotation speed fluctuation [s], S: rotation speed of the rotary shaft [min$^{-1}$], J: inertia of the rotary shaft [kg·m$^2$], P: maximum power applied to the motor [W], Pc: sum of cutting power and power loss [W]], and the thus prepared power limit line is displayed on the fluctuation diagram.

2. The method for monitoring rotation speed fluctuation of a rotary shaft of a machine tool according to claim 1 further comprising
a fluctuation position-calculating step in which a new fluctuation position not exceeding the power limit line but with at least one of a larger fluctuation amplitude and a shorter fluctuation period compared with the current fluctuation position is calculated; and
a second displaying step in which the new fluctuation position is displayed on the fluctuation diagram with a guide of the change from the current fluctuation position.

3. The method for monitoring rotation speed fluctuation of a rotary shaft of the machine tool of claim 2, wherein the new fluctuation position is a position on the power limit line where the fluctuation amplitude is the same as that of the current fluctuation position.

4. The method for monitoring rotation speed fluctuation of a rotary shaft of the machine tool of claim 2, wherein the new fluctuation position is a position on the power limit line where the fluctuation amplitude is at its maximum.

5. A monitor apparatus for monitoring rotation speed fluctuation of a rotary shaft in a machine tool having the rotary shaft driven by a motor after mounting a tool or a workpiece thereon, and a rotation speed-fluctuating unit for continuously fluctuating rotation speed of the rotary shaft at an arbitrary pattern; said monitor apparatus having a display section for monitoring fluctuation of the rotation speed by the rotation speed-fluctuating unit; wherein the monitor apparatus comprises
  a diagram-preparing unit which prepares a fluctuation diagram showing an amplitude of the rotation speed fluctuation in relation to a period of the rotation speed fluctuation, and displays the thus prepared diagram on the display section;
  a first displaying unit which displays a current fluctuation position on the fluctuation diagram; and
  a power limit line-displaying unit which prepares a power limit line for the fluctuation period of the motor based on the following equation:

$$Q = \frac{45000}{\pi^2 S^2 J}(P - Pc)R.$$

[Q: amplitude of the rotation speed fluctuation [%], R: period of the rotation speed fluctuation [s], S: rotation speed of the rotary shaft [min$^{-1}$], J: inertia of the rotary shaft [kg·m$^2$], P: maximum power applied to the motor [W], Pc: sum of cutting power and power loss [W]], and the thus prepared power limit line is displayed on the fluctuation diagram.

6. The monitor apparatus for monitoring rotation speed fluctuation of a rotary shaft in a machine tool according to claim 5 further comprising
  a fluctuation position-calculating unit which calculates a new fluctuation position not exceeding the power limit line but with at lease one of a larger fluctuation amplitude and a shorter fluctuation period compared with the current fluctuation position; and
  a second displaying unit which displays the new fluctuation position on the fluctuation diagram with a guide of the change from the current fluctuation position.

7. The monitor apparatus for monitoring rotation speed fluctuation of a rotary shaft in a machine tool according to claim 6, wherein the new fluctuation position is a position on the power limit line where the fluctuation amplitude is the same as that of the current fluctuation position.

8. The monitor apparatus for monitoring rotation speed fluctuation of a rotary shaft in a machine tool according to claim 6, wherein the new fluctuation position is a position on the power limit line where the fluctuation amplitude is at its maximum.

9. A machine tool having a rotary shaft driven by a motor after mounting a tool or a workpiece thereon, and a rotation speed-fluctuating unit for continuously fluctuating rotation speed of the rotary shaft at an arbitrary pattern further comprising
  the monitor apparatus of claim 5.

* * * * *